United States Patent [19]
Krol et al.

[11] Patent Number: 4,593,387
[45] Date of Patent: Jun. 3, 1986

[54] TIME DIVISION SWITCHING SYSTEM

[75] Inventors: Thijs Krol; Adrianus W. M. van den Enden, both of Eindhoven, Netherlands

[73] Assignee: U.S. Philips Corporation, New York, N.Y.

[21] Appl. No.: 573,782

[22] Filed: Jan. 25, 1984

[30] Foreign Application Priority Data

Jan. 27, 1983 [NL] Netherlands ............... 8300290

[51] Int. Cl.[4] .......................................... H04Q 11/04
[52] U.S. Cl. .................................................. 370/58
[58] Field of Search ...................... 370/58, 67, 64, 66

[56] References Cited

U.S. PATENT DOCUMENTS

| | | | |
|---|---|---|---|
| 3,673,336 | 6/1972 | Thomas | 370/67 |
| 3,769,461 | 10/1973 | Lewis | 370/67 |
| 4,355,384 | 10/1982 | Genter et al. | 370/64 |
| 4,425,640 | 1/1984 | Philip et al. | 370/64 |
| 4,473,900 | 9/1984 | Belforte et al. | 370/58 |
| 4,489,412 | 12/1984 | Duplessis et al. | 370/58 |

FOREIGN PATENT DOCUMENTS 3030828  2/1982  Fed. Rep. of Germany ........ 370/58

OTHER PUBLICATIONS

"Proteo System: An Overview", by Galimberti et al., CSELT Rapporti Tecnici-vol. IX-Supplemento al N. 5, Oct. 1981, pp. 501-508.

Primary Examiner—Douglas W. Olms
Attorney, Agent, or Firm—William J. Streeter; Leroy Eason

[57] ABSTRACT

A time division switching system to which incoming and outgoing transmission channels designed for the transmission of bit streams subdivided into bits are connected. The system has a number N of time division switching stages, a number N of distributors and a number N of collectors, each distributor has N inputs to which an incoming transmission channel is connected, each collector has N outputs to each of which is connected an outgoing transmission channel, each distributor has N outputs, each of the N outputs of a distributor being connected to an input of each of the time division switching stages for a proportionate distribution according to a predetermined pattern of the bit stream of each incoming transmission channel over the N time division switching stages, and each collector has N inputs, each of the N inputs of a collector being connected to an output of each of the time division switching stages for collecting according to a predetermined pattern the bit streams for each outgoing transmission channel.

4 Claims, 5 Drawing Figures

| k1[16] | f[16] 0 | 1 | 2 | 3 | 4 | 5 | 6 | ..... | 13 | 14 | 15 |
|---|---|---|---|---|---|---|---|---|---|---|---|
| 0 | 0-4 | 5-9 | 10-14 | 15-19 | 20-24 | 25-29 | 30-34 | ..... | 65-69 | 70-74 | 75-79 |
| 1 | 5-9 | 10-14 | 15-19 | 20-24 | 25-29 | 30-34 | 35-39 | ..... | 70-74 | 75-79 | 0-4 |
| 2 | 10-14 | 15-19 | 20-24 | 25-29 | 30-34 | 35-39 | 40-44 | ..... | 75-79 | 0-4 | 5-9 |
| 3 | 15-19 | 20-24 | 25-29 | 30-34 | 35-39 | 40-44 | 45-49 | ..... | 0-4 | 5-9 | 10-14 |
| 4 | 20-24 | 25-29 | 30-34 | 35-39 | 40-44 | 45-49 | 50-54 | ..... | 5-9 | 10-14 | 15-19 |
| 5 | 25-29 | 30-34 | 35-39 | 40-44 | 45-49 | 50-54 | 55-79 | ..... | 10-14 | 15-19 | 20-24 |
| 6 | 30-34 | 35-39 | 40-44 | 45-49 | 50-54 | 55-59 | 60-64 | ..... | 15-19 | 20-24 | 25-29 |
| ⋮ | ⋮ | ⋮ | ⋮ | ⋮ | ⋮ | ⋮ | ⋮ | ..... | ⋮ | ⋮ | ⋮ |
| 13 | 65-69 | 70-74 | 75-79 | 0-4 | 5-9 | 10-14 | 15-19 | ..... | 50-54 | 55-59 | 60-64 |
| 14 | 70-74 | 75-79 | 0-4 | 5-9 | 10-14 | 15-19 | 20-24 | ..... | 55-59 | 60-64 | 65-69 |
| 15 | 75-79 | 0-4 | 5-9 | 10-14 | 15-19 | 20-24 | 25-29 | ..... | 60-64 | 65-69 | 70-74 |

FIG. 2

TIME DIVISION SWITCHING SYSTEM

BACKGROUND OF THE INVENTION

1. Field of the Invention

The invention relates to a time division switching system to which are connected incoming and outgoing transmission channels, which are designed for the transmission of bit streams divided into bits, a time division switching stage being provided for the time division multiplex transmission of bits from given incoming transmission channels to given outgoing transmission channels via at least one common line.

2. DESCRIPTION OF THE PRIOR ART

Such a switching system is generally known. The integrability of the switching system is of major importance for an environment in which there is only a small space available for the switching system and moreover a low dissipation is required, as is the case when the switching system is used on board of a satellite. Since the required amount of chip surface area is larger than can be realized on a single chip, the switching system will have to be arranged on a number of chips. It is then found that usually the number of connection pins per chip is of greater importance for the question whether the switching system is integrable than the amount of chip surface area in itself. Another factor playing a part in the integrability is the variety of types of chips of which the switching system is composed.

The invention has for its object to provide a switching system which is integrable in such a sense that a small number of chips with an acceptable number of connection pins per chip and a small number of chip types are sufficient.

SUMMARY OF THE INVENTION

According to the invention, the time division switching system of the aforementioned kind is therefore characterized in that the switching system has a number N of time division switching stages, a number N of distributors and a number N of collectors, in that each distributor has N inputs to which an incoming transmission channel is connected and each collector has N outputs to each of which an outgoing transmission channel is connected, in that each distributor has N outputs, each of the N outputs of a distributor being connected to an input of each of the time division switching stages in order that the bit stream of each incoming transmission channel is proportionately distributed according to a predetermined pattern over the N time division switching stages, and in that each collector has N inputs, each of the N inputs of a collector being collected to an output of each of the time division switching stages in order that the bit streams for each out-going transmission channel are collected according to a predetermined pattern.

An advantage of the switching system according to the invention is that it behaves like a single-stage network. This means that only the number of the A subscriber and the number of the B subscriber need be transmitted to the switching system and, for example, no routing information need be transmitted to it.

A first embodiment of the division switching system is characterized in that each time division switching stage has N common lines which are coupled to all N inputs and outputs of this time division switching stage for the time division multiplex transmission of one bit from the incoming transmission channels to the outgoing transmission channels. Since the information is transmitted bitwise via the common (multiplex) lines, a one-bit register per incoming transmission channel in the time division switching stage is sufficient. Each time division switching stage is provided with a routing memory. The routing memory of each time division switching stage comprises the complete routing information of all time division switching stages together. Each routing memory is preferably arranged on the same chip as the relevant time division switching stage because otherwise the number of required connection pins would become prohibitively large. An advantage of this first embodiment of the time division switching system is that the switching delay is a minimum. A further advantage is that the number of storage elements per channel is as small as possible.

A second embodiment of the time division switching system is characterized in that each time division switching stage has a common bus lines, which bus lines are coupled via N-bit registers to each input and to each output of each time division switching stage in order that a bit group is transmitted in time division multiplex from the incoming transmission channels to the outgoing transmission channels.

In this second embodiment the routing memory can be arranged externally. In general, the switching delay is, like the number of required storage elements, larger than in the first embodiment.

The embodiments of the invention and their advantages will be explained more fully with reference to the drawing, the same reference symbols being used for corresponding elements.

DESCRIPTION OF THE DRAWING

FIG. 2 shows a table of the connection matrix of a distributor according to the invention;

DESCRIPTION OF THE PREFERRED EMBODIMENTS

Figure 1:
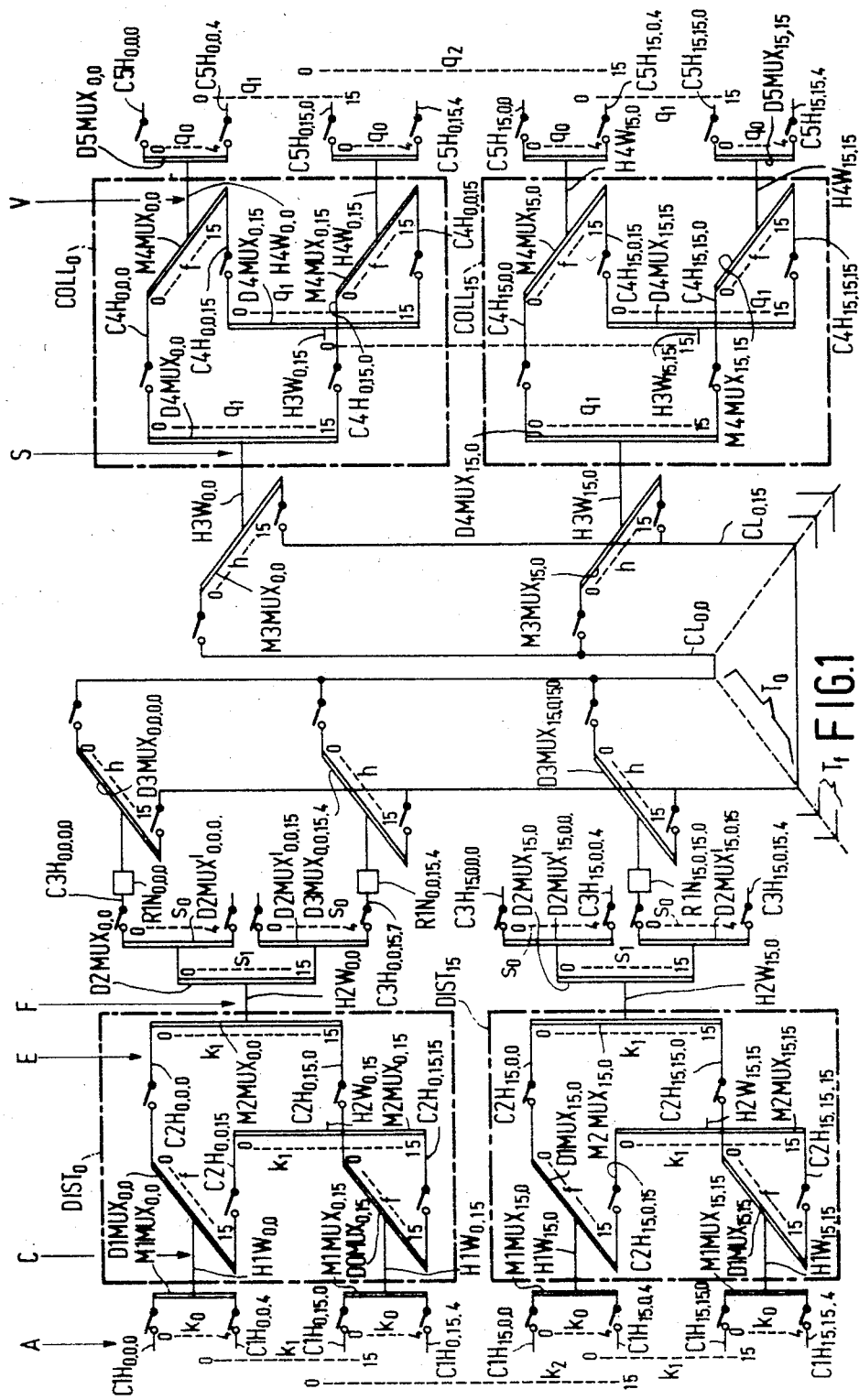
FIG. 1 shows a first embodiment of a time division switching system according to the invention.

FIG. 1 shows a first embodiment of a time division switching system, which is designed, by way of example, for connecting without blocking 1280 incoming transmission channels $C1H_{k2,k1,ko}$ to the same number of outgoing transmission channels $C5H_{q2,q1,qo}$. (The symbols used and their definitions are listed at the end of the description). For this purpose, in this embodiment the switching system has 16 (generally N) distributors $DIST_{k2}$, time division switching stages $T_f$ and collectors $COLL_{q2}$. The incoming transmission channels $C1H_{k2,k1,ko}$ are connected in $K_2$ groups each of $K_1$ subgroups, each subgroup comprising $K_o$ channels, connected to inputs of the switching system, which inputs are located in FIG. 1 on the vertical line A. In the example chosen, $K_2=K_1=16$ and $K_o=5$. Each subgroup of $K_o$ channels is transmitted bitwise in time division multiplex by the multiplexers $M1MUX_{k2,k1}(k2=0,1,2,\ldots,15; k1=0,1,2,\ldots,15)$ to the highway $H1W_{k2,k1}$. A multiplexer can be represented as a switched throughconnection of the lines of channels to be multiplexed. In the Figures, a multiplexer will therefore be indicated as a double connection line to which the multiplexed lines or channels are each connected via a switch. The multiplexing operation is then fully determined by the pattern according to which the switches are closed. The switches of the multiplexers M1MUX$_{k2,k1}$ can therefore be each time closed by a modulo-5-counter in the present case. In fact, the operation of closing the switches in the sampling of the line in which the switch to be closed is situated and can be represented by the equality:

$$\text{cnt }[5]=k_o[5] \tag{1}$$

This equality expresses that the counter position of a counter, cnt, counted in the modulo-5 mode, ([5]) indicates, which of the lines, determined by the variable $k_o$, is switched on.

A demultiplexer will be represented correspondingly by a double connection line giving access to the demultiplexed lines (or channels) over which each receives the demultiplexed signal via a switch which is closed at a suitable instant. Altogether there are $K_2.K_1$, so in this embodiment 16.16=256, highways H1W$_{k2,k1}$, which each comprise $K_o$=5 time slots per frame. The $K_1$ highways H1W$_{k1,k2}$ of each group are supplied to an equal number of inputs of a distributor DIST$_{k2}$ (k2=0,1,2, . . . , 15). The inputs of the distributor are located on the vertical line indicated by C in the Figure. The distributors DIST$_{k2}$ are of identical construction; therefore, as to the description of the construction of the distributors a description of one distributor, i.e. DIST$_o$, will be sufficient.

Each input of the distributor DIST$_o$ is connected to a demultiplexer D1MUX$_{o,k1}$, which demultiplexes the incoming (multiplex) channels into 16 channels C2H$_{o,k,f}$ (f=0,1,2, . . . , 15) in such a manner that a first group of $K_o$=5 bits, therefore the bits 0-4, is supplied to the channel C2H$_{o,o,o}$; a second group of $K_o$=5 bits is supplied to the channel C2H$_{o,o,1}$ therefore the bits 5-9; so in general an f$^{th}$ group of $K_o$=5 bits is supplied to the channel C2H$_{o,o,f}$. In a corresponding manner, but cyclically shifted, groups of $K_o$ bits are supplied to the relevant channels in the remaining distribtors DIST$_{k2}$. So in general the bits:

$$5\cdot(f[16]+k1\ [16])[16]+x[5] \tag{2}$$

where "[16]" means that the preceding parameter should be counted in modulo-16 mode. The term $\times$[5] indicates a value between 0 and 4, inclusive. In the table shown in FIG. 2 there is indicated how for one cycle, (which consequently relates to $K_o \cdot K_1$=5.16 time slots or bits, because each time slot comprises one bit), the bits on highways H1W$_{o,k1}$ are distributed over the channels C2H$_{o,k,f}$. The rows of the matrix in the table of FIG. 2 indicate how the bit stream on a specific highway H1W$_{o,k1}$, subdivided into 16 groups of 5 bits, is distributed over the F=16 channels C2H$_{o,k1,o}$-C2H$_{o,k1,15}$ via the demultiplexer D1MUX$_{o,k1}$ connected to that highway. The vertical line at E indicates where these bit streams are situated.

The corresponding channels C2H$_{o,o,f}$-C2H$_{o,15,f}$, so channels with the same f subscript, are then multiplexed again on a highway H2W$_{o,f}$ of the distributor DIST$_o$. The columns of the matrix of the table of FIG. 2 indicate how the bit stream on a specific highway H2W$_{o,f}$ is composed of contributions of $K_o$=5 bits originating from parts of the bit streams of all highways H1W$_{o,k1}$. A frame on a highway H2W$_{o,f}$ comprises 16 time slots of 5 bits each.

The switches for controlling the demultiplexers D1MUX$_{o,k1}$ and the multiplexers M2MUX$_{o,f}$ can be combined here. The table in FIG. 2 (and formula (2)) further indicates which switch should be closed during which period in order to cause the demultiplexers and multiplexers of the distributors DIST$_o$ to operate in the manner described.

The distributors thus distribute the traffic present on the highways H1W$_{k2,k1}$ over the highways H2W$_{k2,f}$ according to a predetermined pattern, i.e. a pattern which is therefore independent of communication desires of the connected subscribers, routing data etc.

The F=16 outputs of each distributor DIST$_{k2}$ are located in the plane of the vertical line indicated in FIG. 1 by F.

The outputs of each distributor are each connected to an input of one of the time division switching stages T$_f$ in such a manner that an output of each distributor is connected to one of the inputs of each time division switching stage. Each time division switching stage comprises K2 demultiplexers D2MUX$_{k2,f}$, of which in each time interval one is connected to an input of the time division switching stage T$_f$. The demultiplexers D2MUX$_{k2,f}$ demultiplex by a factor 80, as a result of which, when the demultiplexers are suitably controlled, exactly one bit of each frame on the highway H2W$_{k2,f}$ will be present in each time slot at one of the lines C3H$_{k2,f,s1,so}$. The number of lines C3H$_{k2,f,s1,so}$ is exactly equal to the number of incoming lines. In the example chosen this number is consequently 1280.

The demultiplexers D2MUX$_{k2,f}$ may alternatively each be constructed as a two-stage demultiplexer, as indicated in FIG. 1. The first demultiplexers D2MUX$_{k2,f}$ then demultiplex by a factor $S_1$, while the second demultiplexers D2MUX$^1_{k2,f3,s1}$ demultiplex by a factor $S_o$. The demultiplexer pair is jointly controlled, i.e. by closing the switches, which are present in the lines C3H$_{k2,f,s1,so}$, at a suitable instant for the duration of one bit period. This is achieved in that each time division switching stage T$_f$ is provided with a counter, which closes the $S_1$ $S_o$ switches of each time division switching stage at the instants given by the following equality:

$$\text{cnt }[80]=5(f[16]+s_1[16])[16]+s_o[s] \tag{3}$$

The bit stream on the highway H2W$_{o,o}$ of the distributor DIST$_o$ is thus supplied to the time division switching stage T$_o$; the bit stream on the highway H2W$_{o,1}$ of the distributor DIST$_o$ is supplied to the time division switching stage T$_1$, etc. The bit streams of all (80) incoming lines of the distributor DIST$_o$ are thus distributed over all (16) the time division switching stages present T$_f$(f=0,1, . . . ,15). The remaining distributors DIST$_{1-15}$, to which the remaining (1200) incoming lines are connected, distribute in a corresponding manner per distributor the whole supply of traffic proportionately over the present (16) time division switching stages T$_f$. The time division switching stages are formed in FIG. 1 by that part of the switching system which is located between the planes in which lie the vertical line indicated by F and the vertical line indicated by S.

Each line C3H$_{k2,f,s1,so}$ comprises a register (for example a flipflop) for storing one bit.

Each time division switching stage $T_f$ comprises H common lines $CL_{f,h}$. Each incoming line $C3H_{k2,f,s1,so}$ of one time division switching stage is connected via a demultiplexer $D3MUX_{k2,f,s1,so}$ to all the H common lines of that time division switching stage, while the H common lines $CL_{f,h}$ are connected via a multiplexer $M3MUX_{q2,f}$ to an output of the time division switching stages. The outputs of the time division switching stages $T_f$ are located in the plane of the vertical line indicated in FIG. 1 by S. The demultiplexers $D3MUX_{k2,f,s1,so}$ are controlled by the routing information, which for this purpose is stored in a routing memory. The routing information is determined from the communication desires of the subscribers connected to the incoming lines. The construction and the operation of the routing memory will be explained with reference to FIG. 3.

Figure 3:
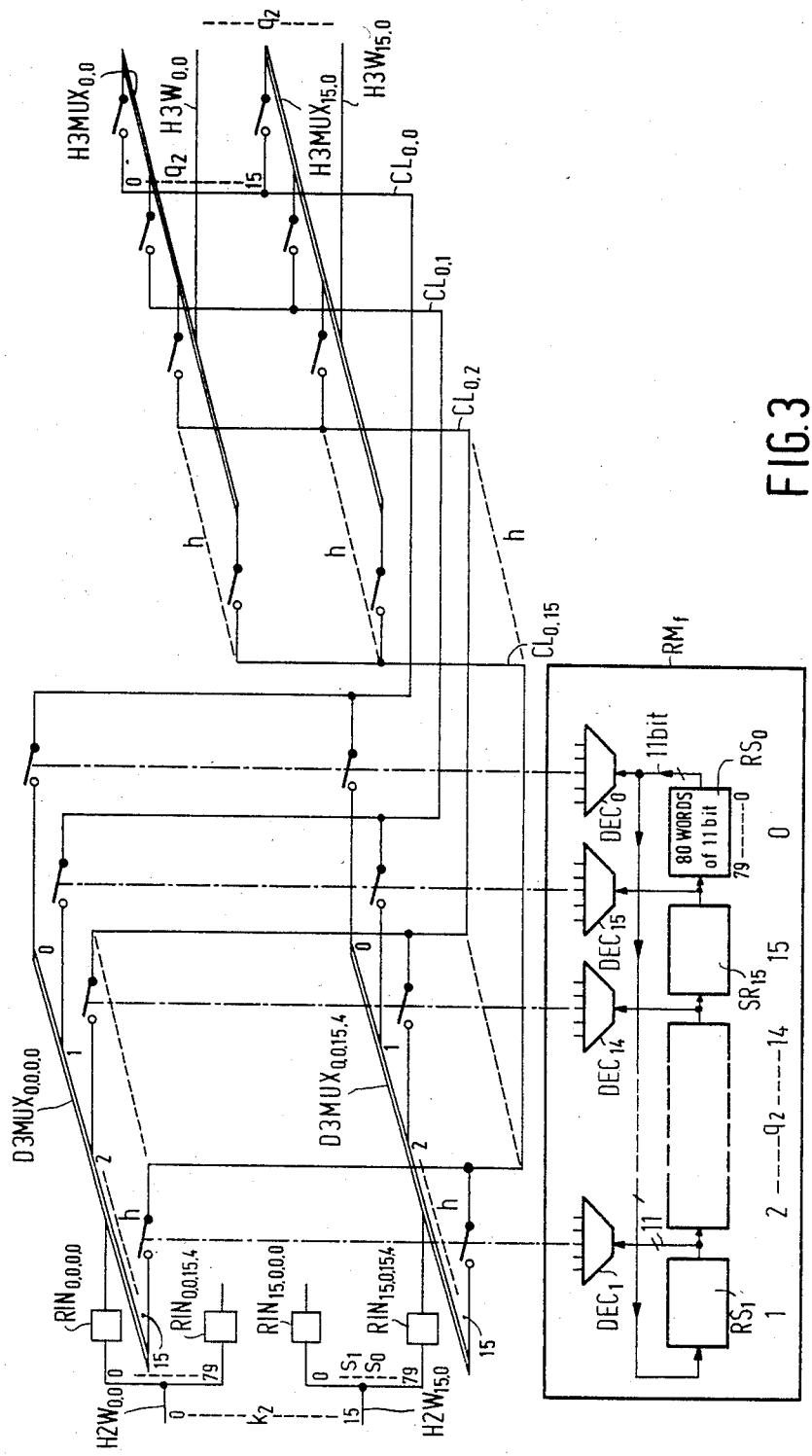
FIG. 3 shows a routing memory for use in the switching system shown in FIG. 1.

FIG. 3 is a schematic view of one time division switching stage $T_f$ and the associated routing memory $RM_f$ (f=0,1,2, ... 15). The routing memory comprises 16 shift registers $SR_{q2}$ (q2=0,1, ...,15), each shift register comprising 80 words of 11 bits each (in fact the numerical sequence 0-1279 can be covered by 11 bits). A routing memory $RM_f$ in a given switching stage $T_f$ comprises the complete routing information. In each bit period 16 different switches, determined by 16 different words of 11 bits, are closed in each time division switching stage $T_f$. The routing memory $RM_f$ is preferably arranged on the same chip as the associated time division switching stage because in the other case the routing memory would have to comprise an unpractically large number of pins, i.e. 11·16=176 pins, for controlling the switches of the associated time division switching stage.

An output of a shift register is connected to an input of a next shift register, the output of the last shift register being connected to the input of the first shift register. Further, there is connected to each output of a shift register $SR_{q2}$ a "1-out-of-1280" decoder $DEC_{q2}$ (q2=0,1, ... ,15). The output of each "1-out-of-1280" decoder $DEC_{q2}$ is connected to 1280 switches for closing one of the switches, i.e. that switch whose address is supplied at that instant by the shift register $SR_{q2}$ to the decocer $DEC_{q2}$ or is decoded. The switch which is closed can be derived from the following equality:

$$\text{cnt}[1280] = 80 \cdot (q_2[16] + h[16]) \quad [16] + + 5(f[16] + q_1[16]) [16] + q_0[5] \tag{4}$$

where $q_2$, $q_1$, $q_o$ represent the outgoing line for which the bit is intended, which is transmitted by the closure of that switch.

The common lines are connected, as already stated above, via $Q_2$ multiplexers $M3MUX_{q2,f}$ (q2=0,1, ..., 15) to the outputs of the time division switching stages. The $Q_2 \cdot F$ multiplexers $H3MUX_{q2,f}$ of the F time division switching stages are controlled in the manner indicated by the following equality:

$$\text{cnt}[1280] = 80(q_2[16] + h[16]) [16] + x[80] \tag{5}$$

where x [80] represents a quantity which can assume a value 0 to 79. This means that, for example, the switch indicated by $q_2$=3, h=2 is closed during the instants (counter positions) 400 to 479 inclusive.

The outputs of the time division switching stages are located on the vertical line indicated in FIG. 1 by S. The outputs of each time division switching stage are connected to inputs of collectors $COLL_{q2}$. The collectors $COLL_{q2}$ each have F inputs, each of the F inputs being connected to an output of another time division switching stage so that each collector receives a part of the bit stream of all time division switching stages.

The collectors $COLL_{q2}$ are as to their construction and operation comparable with the distributors and therefore also each consist of a demultiplexermultiplexer pair with combined control. The F demultiplexers $D4MUX_{q2,f}$ of collectors $COLL_{q2}$ each demultiplex by a factor $Q_1$ and the $Q_1$ multiplexers $M4MUX_{q2,q1}$ each multiplex by a factor F. The control of each demultiplexer-multiplexer pair is given by the equality:

$$\text{cnt}[80] = 5(f[16] + q_1[16]) [16] + x[5] \tag{6}$$

An output of each of the $Q_1$ multiplexers $M4MUX_{q2,q1}$ of a collector is each time connected to an output of the associated collector $COLL_{q2}$. These outputs are located on the vertical line indicated in FIG. 1 by V.

To each output of a collector $COLL_{q2}$ is connected a demultiplexer $D5MUX_{q2,q1}$ which demultiplexes by a factor $Q_o$. These multiplexers are controlled by switches which close according to the equality:

$$\text{cnt}[5] = q_o[5] \tag{7}$$

The $Q_o$ outputs of each demultiplexer are connected to $Q_o$ outgoing transmission channels, as a result of which altogether $Q_2 \cdot Q_1 \cdot Q_o (=16 \cdot 16 \cdot 5 = 1280)$ outgoing transmission channels are reached.

Such a time division switching system is particularly suitable for use on board of a satellite. In fact, the switching system is entirely realizable with integrated circuits. According to the contemporary act of the technology, a switching system for 1280 channels, in which each channel can transmit 8.5 Mb/s (a television channel), would require only 48 chips and moreover only two types of chips: 16 distributor chips, 16 collector chips (identical with distributor chips) and 16 time division switching stage chips. The number of connection pins of the distributor/collector chips and the time division switching stage chips is also very acceptable, i.e. approximately 40 (a pin for each of the 16 inputs, 16 outputs and a number of pins for supplying a feed voltage and the like). Otherwise, the results to be attained in this manner, i.e. small space, low disspation and low production cost, are such that they can be fully utilized also in terrestrial applications (public and domestic and industrial telephone and telegraph exchanges).

In the above description it is assumed that the components used are ideal, which means that especially the electronic delays of the practical components used are left out of consideration. The manner in which these delays can be taken into account is obvious to those skilled in the art.

Figure 4:
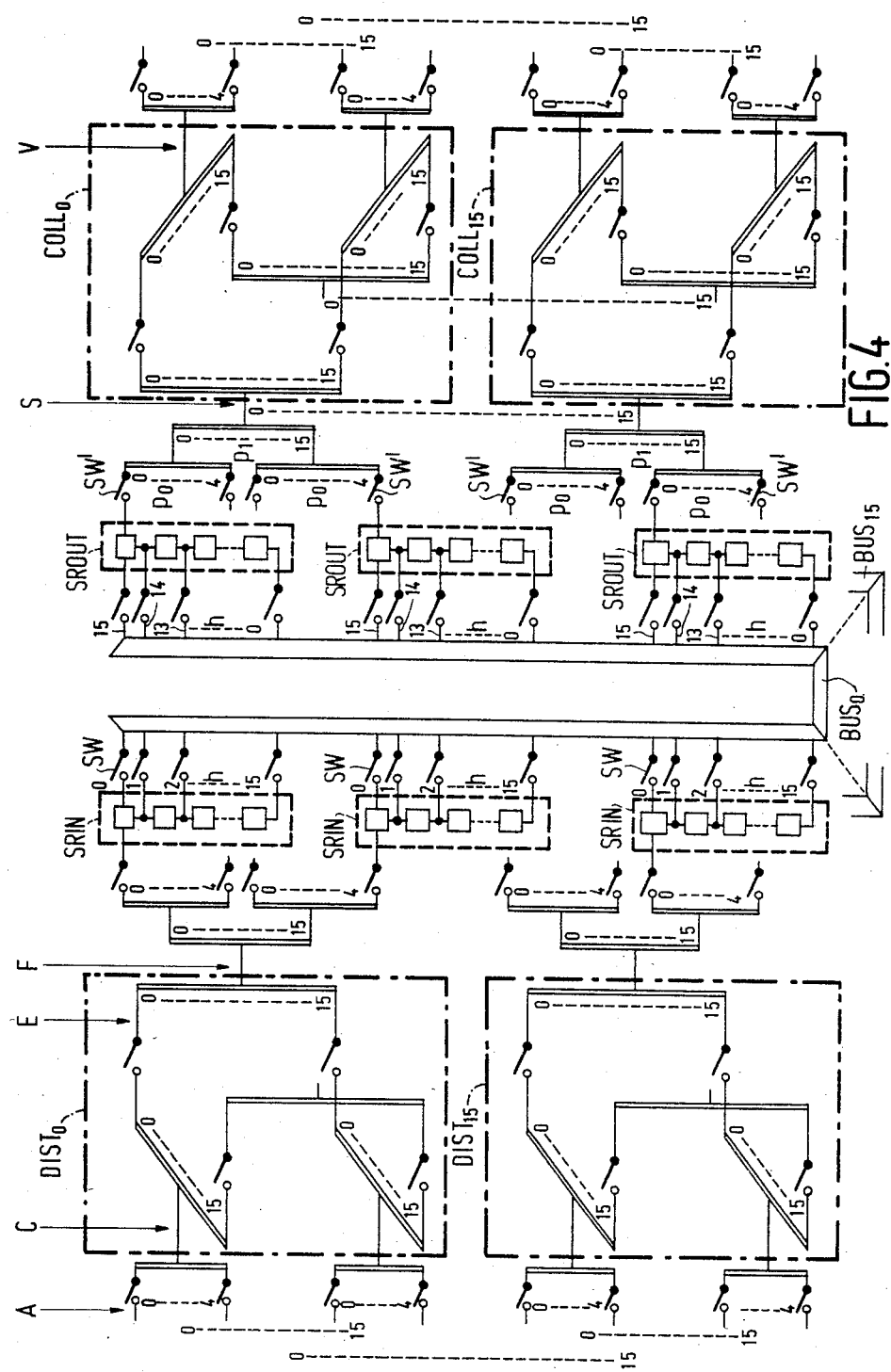
FIG. 4 shows a second embodiment of a time division switching system according to the invention.

FIG. 4 shows a second embodiment of a time division switching system. Since only the time division switching stages differ from those of the first embodiment, as to the construction and operation of the remaining parts of the switching system (especially the distributors and collectors), reference is invited to the above description thereof.

Demultiplexers $D2MUX_{k2,f}$ and $D2MUX_{k2,f,s1}'$ are connected to the inputs of the time division switching stages $T_f$ in the same manner as in the first embodiment and they are also controlled in a corresponding manner, that is to say as described with the aid of the formula (3). The demultiplexed bit streams at each of the channels $C3H_{k2,f,s1,so}$ are supplied in contrast to the first embodiment not to a one-bit shift register, but to an H-bit shift register $SRIN_{k2,f,s1,so}$; which is included in each channel $C3H_{k2,f,s1,so}$. The shift registers $SRIN_{k2,f,s1,so}$ are provided with H branches, i.e. a branch after each cell. In each branch is included a controlled switch $SW_{k2,f,s1,so,h}$, which it is included to one line of an H-bit bus line $BUS_f$. The shift registers SRIN are clocked at a time rate corresponding to that of the channel of the demultiplexer in which the shift register is included (hence to a time rate as given by the formula (3)).

Figure 5:
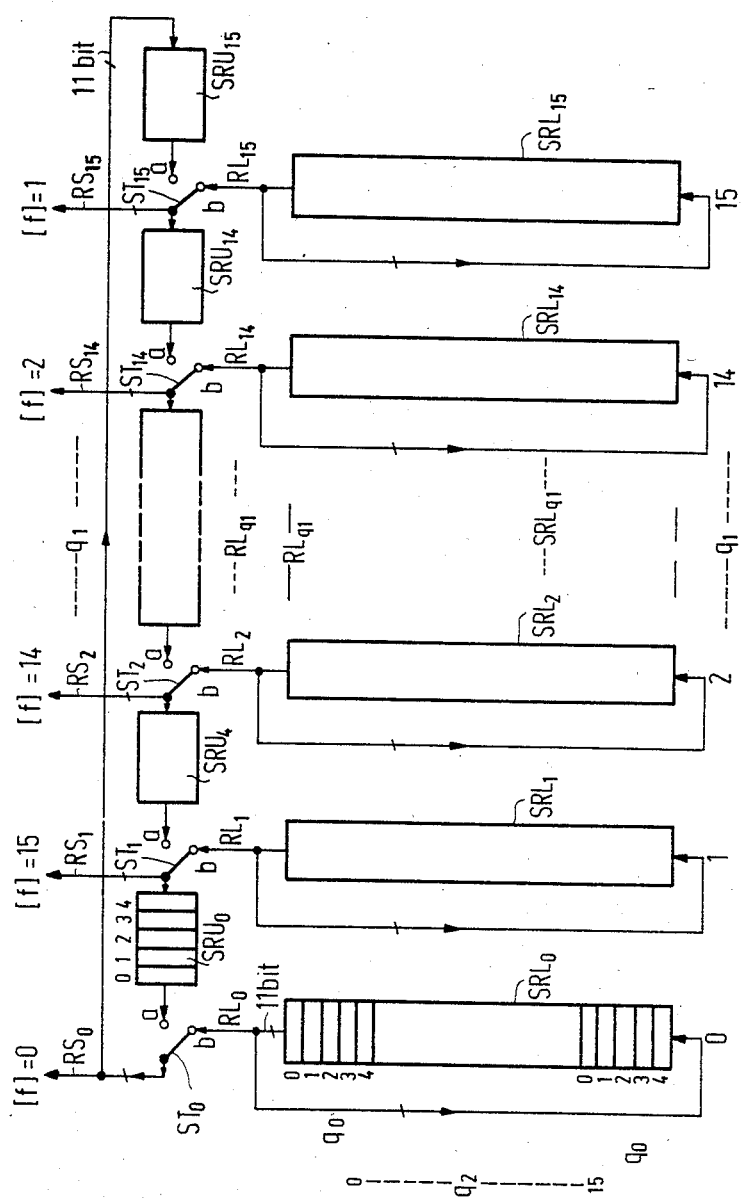
FIG. 5 shows a routing memory for use in the switching system shown in FIG. 4.

The switches SW of each time division switching state $T_f$ are controlled by a signal given by $$\text{cnt }[1280]=80\cdot q_2[16]+5\cdot (f[16]+ +q_1[\neq])[16]+q_o[5] \qquad (8)$$

where $q_2$, $q_1$ and $q_o$ characterize the outgoing transmission channel to which the bit streams should be transmitted. These quantities are determined from the communication desires and are stored in a routing memory. An embodiment of a routing memory is shown in FIG. 5.

The routing memory comprises $Q_1$ basic units each comprising a fed-back shift register $SRL_{q1}$, a shift register $SRU_{q1}$ and a two-position switch $ST_{q1}$. The fed-back shift register $SRL_{q1}$ comprises $Q_2,Q_o$ storage locations of at least 11 bits each (the addresses 0–1279 can be represented by 11 bits). The output of each fed-back shift register $SRL_{q1}$ is connected to its input and to a contact, i.e. the b contact, of the switch $ST_{q1}$. The shift registers $SRU_{q1}$ are connected by their outputs of the a contact of the switch $ST_{q1}$ and are connected by their inputs to the pole of the switch $ST_{(q1+1)[16]}$. The pole of each switch $ST_{q1}$ is further coupled via a "1-out-of-1280" decoder (not shown) to all the switches of a given time division switching stage $T_f$. The pole of the switch $ST_o$ is coupled to the $K_2S_1,S_o$ (=1280) switches in a time division switching stage $T_o$ via the output $RS_o$; the pole of the switch $ST_1$ is coupled to the switches in the time division switch $T_{15}$ via the output $RS_1$; the pole of the switch $ST_2$ is coupled to the switch in the time division switching stage $T_{14}$ via the output $RS_2$; etc.

The locations of the words in the shift registers $SRL_{q1}$ can be represented by the three variables $q_2$, $q_1$ and $q_o$. The locations comprise the word (address) $(k_2,s_1,s_o)$ of the switches $SW_{k2,f,s1,so,h}$ in the time division switching stages $T_f$. The address $(k_2,s_1,s_o)$ is associated with the address $(q_2,q_1,q_o)$ of the outgoing transmission channel for which the bit to be switched is intended.

The fed-back shift registers $SRL_{q1}$ are clocked only at the instants for which it holds that the modulo-80 value is less than 5, so at the instants 0,1,2,3,4,80,81,82,83,84, 160,161, ... etc. At these instants the switches $ST_{q1}$ are set to the b position shown and the 11 bits address from the fed-back shift register $SRL_{q1}$ is supplied to the output $SR_{q1}$. Further, these 11 bits addresses are supplied to the shift registers $SRU_{(q1-1)[15]}$ of the preceding basic units.

At all the other instants the switches $ST_{q1}$ are set to the a position and the addresses present in the shift registers $SRU_{q1}$ are supplied to the outputs RS. The shift registers $SRU_{q1}$ constitute in the position a of the switches also a fed-back shift register having a length of $Q_o.Q_1$ (=80 bits). The shift registers $SRU_{q1}$ are clocked continuously, that is to say independently of the position of the switches $ST_{q1}$.

Since the routing memory has $Q_1$ (=16) outputs, the routing memory need not be arranged on the same chip as the remaining part of the time division switching stage.

The group of H switches $SW_{k2,f1,s1,so}$ (FIG. 4) is closed, as set out above, at an instant determined by the routing memory and transmitted via the relevant bus line $BUS_f$. The bus lines $BUS_f$ are sampled on the output side by switches $SW_{k2,f,s1,so}'$, which for this purpose are connected to the bus lines. The samples are written in parallel into a H-bit shift register $SROUT_{k2,f,s1,so}$. The switches SW' are sampled in the counter positions of a counter cnt given by:

$$\text{cnt }[1280]=80\cdot q_2[16]+5(f[16]+ +p_1[16])[16]+p_o[5] \qquad (9)$$

where $p_1$ and $p_o$ are the numbers of the input lines of the multiplexers $M3MUX_{q2,f}$ and of $M3MUX_{q2,f,p1}'$, respectively which are connected in cascade to an output of each H-bit shift register $SROUT_{k2,f1,s1,so}$. The outputs of the multiplexers $M3MUX_{q2,f}$ are connected to the outputs of the time division switching stages $T_f$ and are located in the plane of the vertical line indicated by S in FIG. 4. In the same manner as in the first embodiment, the inputs of the collectors $COLL_{q2}$ are connected to these outputs. For the description of the remaining part of the switching system reference is therefore invited to the description of FIG. 1.

DEFINITIONS

CiH: transmission channel i (i=1,2,3,4,5)
MiMUX: multiplexer i (i=1,2,3,4)
HiW: highway i (i=1,2,3,4)
DiMUX: demultiplexer i (i=1,2,3,4,5)
$C1H_{k2,k1,ko}$: transmission channel $k_o$ of the $k2^{nd}$ group and the $k1^{st}$ subgroup;
$M1MUX_{k2,k1}$ : multiplexer to which ko transmission channels of the $k2^{nd}$ groups and the $k1^{st}$ subgroup are connected;
$H1W_{k2,k1}$ : outgoing highway of multiplexer $M1MUX_{k2,k1}$;
$D1MUX_{k2,k1}$ : demultiplexer connected to highway $H1W_{k2,k1}$ and having a demultiplexing factor F;
$C2H_{k2,k1,f}$: the $f^{th}$ transmission channel of demultiplexer $D1MUX_{k2,k1}$;
$M2MUX_{k2,f}$: multiplexer to which the $k1^{st}$ transmission channels of each $k2^{nd}$ group and the $f^{th}$ order are connected;
$H2W_{k2,f}$ : outgoing highway of multiplexer $M2MUX_{k2,f}$;
$D2MUX_{k2,f}$: demultiplexer to which highway $H2W_{k2,f}$ is connected and which has a demultiplexing factor $S_1$;
$D2MUX_{k2,f,s1}'$: demultiplexer connected to the $s_1^{th}$ output of the demultiplexers $D2MUX_{k2,f}$ having a demultiplexing factor $S_o$;
$C3H_{k2,f,s1,so}$: outgoing channel of demultiplexer $D2MUX_{k2,f,s1}'$;
$RIN_{k2,f,s1,so}$: one-bit register in outgoing channel $C3H_{k2,f,s1,so}$;
$D3MUX_{k2,f,s1,so}$: demultiplexer connected to channel $C3H_{k2,f,s1,so}$ and having a demultiplexing factor H;
$CL_{f,h}$ common line to which the $K_2.S_1.S_o$ demultiplexers $D3MUX_{k2,f,s1,so}$ are connected
$M3MUX_{q2,f}$ multiplexer to which H common lines $CL_{f,h}$ are connected;
$H3W_{q2,f}$ : outgoing highway of multiplexer $M3MUX_{q2,f}$;
$D4MUX_{q2,f}$ : demultiplexer connected to highway $H3W_{q2,f}$ and having a demultiplexing factor $Q_1$;

C4H$_{q2,q1,f}$ : outgoing channel of demultiplexer D4MUXq2,f;

M4MUX$_{q2,q1}$ : multiplexer to which F channels C4H$_{q2,q1,f}$ are connected;

H4W$_{q2,q1}$ : highway connected to multiplexer M4MUX$_{q2,q1}$;

D5MUX$_{q2,q1}$ : demultiplexer which is connected to channel C5H$_{q2,q1,qo}$ and has a demultiplexing factor $Q_o$;

C5H$_{q2,q1,qo}$ : outgoing channel; FIG. 4 moreover indicates:

SRIN$_{k2,f,s1,so}$ : H-bit shift registers in channel C3H$_{k2,f,s1,so}$;

SROUT$_{k2,f,s1,so}$: H-bit shift register;

SW$_{k2,f,s1,so,h}$ : switch in channel C3H$_{k2,f,s1,so}$;

SW$_{k2,f,s1,so}$' : switch connected to but line BUS$_f$;

M3MUX$_{q2,f,p2}$': multiplexer to which P$_1$ multiplexers M3MUX$_{q2,f}$ are connected;

BUS$_f$: H-bit bus lines.

What is claimed is:

1. A time division switching system having incoming and outgoing transmission channels for transmission of information contained in bit streams subdivided into bits, the bits from respective incoming transmission channels being distributed to respective outgoing transmission channels by time division multiplex transmission, said switching system comprising: a number N of time division switching stages, a number N of distributors and a number N of collectors; each distributor having N inputs to each of which an incoming transmission channel is connected and each collector having N outputs to each of which is connected an outgoing transmission channel; each distributor further having N outputs, each of which is connected to an input of each of the time division switching stages, and being adapted to proportionately distribute the bit stream of each incoming transmission channel over the N time division switching stages by multiplexing, distributing and remultiplexing such bit streams according to a predetermined pattern independent of the information contained therein; and each collector further having N inputs, each of which is connected to an output of each of the time division switching stages, and being adapted to collect and proportionately distribute the bit streams for each outgoing transmission channel by multiplexing, distributing and remultiplexing such bit streams according to a predetermined pattern independent of the information contained therein.

2. A time division switching system as claimed in claim 1, wherein each time division switching stage has N inputs and N outputs, and comprises N common lines which are coupled to all the inputs and outputs of that time division switching stage for the time division multiplex transmission of bits from the incoming transmission channels to the outgoing transmission channels.

3. A time division switching system as claimed in claim 2, wherein said common lines of each time division switching stage are connected by N-bit registers to each input and to each output of such time division switching stage for the time division multiplex transmission of groups of bits from the incoming transmission channels to the outgoing transmission channels.

4. A time division switching system as claimed in claim 1, wherein each distributor comprises N multiplexers each having a multiplexing factor N and N demultiplexers each having a demultiplexing factor N, the inputs of the demultiplexers being the respective inputs of such distributor and the outputs of the multiplexers being the respective outputs of such distributor; corresponding outputs of all demultiplexers being connected in the same time slots to successive inputs of each of the multiplexers in accordance with a predetermined pattern which is independent of the information contained in the information contained in the bit streams being transmitted.

* * * * *